united States Patent Office
3,594,374
Patented July 20, 1971

3,594,374
NOVEL N,N-BIS-(BIS-AMINO-S-TRIAZINYL)-
ALKYLAMINES
Denis Varsanyi, Arlesheim, Basel-Land, and Willy Roth, Strengelbach, Aargau, Switzerland, assignors to Geigy Chemical Corporation, Ardsley, N.Y.
No Drawing. Continuation-in-part of application Ser. No. 560,855, June 27, 1966. This application Oct. 4, 1967, Ser. No. 672,701
Claims priority, application Switzerland, June 30, 1965, 9,158/65
Int. Cl. C07d 55/22
U.S. Cl. 260—249.6                    2 Claims

ABSTRACT OF THE DISCLOSURE

New N,N-bis-(bis-amino-s-triazinyl)-alkylamines in which up to 3 of the amino groups may be heterocyclic rings are useful as surface treating agents. Compositions containing certain of these new bis-s-triazinyl alkylamines and certain tris-amino-s-triazines and 1,4-bis-(bis-amino-s-triazinyl)-piperazines are also useful for surface treating, particularly as floor waxes and shoe polishes, and as textile softening components.

CROSS-REFERENCE

This application is a continuation-in-part of our pending patent application, Ser. No. 560,855, filed June 27, 1966, now abandoned.

DETAILED DISCLOSURE

This invention concerns new N,N-bis-(bis-amino-s-triazinyl)-alkylamines in which up to 3 of the amino groups may be heterocyclic ring structures such as pyrrolidino, 4-(lower alkyl)-piperazino, piperidino, morpholino or hexamethyleneimino. These compounds are useful as surface treating agents and are the principal components of new surface treating compositions such as shoe polishes. Certain of these compounds also find utility as textile softening agents.

By "surface treating agents" in the present description are meant agents which can be used for the protection and conservation, e.g. by coating or waxing, of surfaces of all types such as, for example, agents for the treatment of surfaces of inorganic materials such as metal, stone, tile, etc., and of organic materials such as wood, leather, synthetic plastics (e.g. linoleum), textiles, paper, etc.

More particularly, the surface treating agents according to this invention comprise, as principal constituent, s-triazine derivatives of the formula

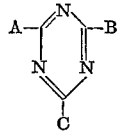

(I)

wherein:

A represents the group

in which $R_1$ represents a lower alkyl radical, namely an alkyl radical of from 1 to 5 carbon atoms, and $R_2$ represents an alkyl radical having from 10 to 18 carbon atoms, B represents the group

in which $R_1$ and $R_2$ have the meanings given above, the pyrrolidino, piperidino, 4-lower alkyl-piperazino, morpholino or hexamethyleneimino group, and C represents the pyrrolidino, piperidino, 4-methylpiperazino, morpholino or hexamethyleneimino radical, or the grouping of the formula

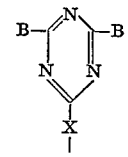

(II)

wherein each B has the meaning given above, and X is an alkylimino radical or the piperazino-1,4-diyl radical, and, in those compounds falling under Formula I in which each of A and B represents the group

C represents besides the substituents defined above, also the group

wherein each of $R_3$ and $R_4$ independently of the other represents a substituted or unsubstituted alkyl radical having from 1 to 20 carbon atoms.

More in particular, the alkyl radicals symbolized by $R_3$ and $R_4$ can be substituted by halogen atoms such as fluorine, chlorine, or bromine atoms, or by hydroxyl groups. Preferably such substituted alkyl radicals have not more than 5 carbon atoms. The alkyl radicals of the alkylamino group symbolized by X contains preferably from 1 to 5 carbon atoms.

The following classes of s-triazines are particularly valuable as main components in the surface treating agents according to this invention.

(I) Compounds of the formula

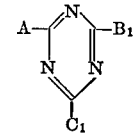

(III)

wherein

A has the same meaning as in Formula I,
$B_1$ represents pyrrolidino, morpholino, piperidino, N-(lower alkyl)-piperazino or hexamethyleneimino, and
$C_1$ represents the same substituents as A, or as $B_1$ or it represents the grouping

in which each of $R_3$ and $R_4$ represents lower alkyl, preferably of from 2 to 5 carbon atoms, substituted by hydroxyl, chlorine, bromine or fluorine; in the latter case, $C_1$ represents also a trifluoromethyl amino group.

The compounds of Formula III in which $C_1$ represents A or $B_1$ are readily emulsifiable.

(II) Compounds of the formula

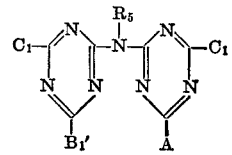

(IV)

wherein
A and $C_1$ have the same meanings as in Formula III,
$B_1'$ represents the same as A or as $B_1$ in Formula III, and
$R_5$ represents alkyl of from 1 to 5 carbon atoms.

(III) Compounds of the formula

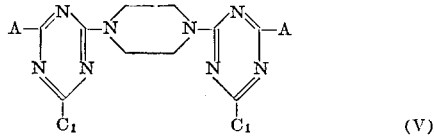

(V)

in which A and $C_1$ have the same meanings as in Formula III.

Among the compounds falling under Formulas III and IV, a subclass of compounds which fall under the formulas

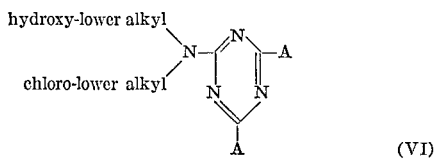

(VI)

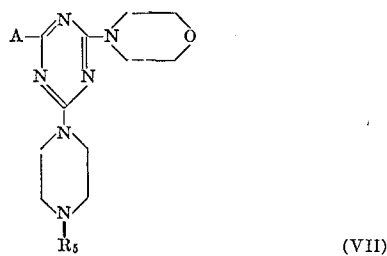

(VII)

and

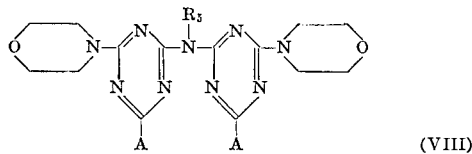

(VIII)

wherein A and $R_5$ have the same meanings as given hereinbefore, are textile softening agents which impart relatively little or no water repellance to detergent-hardened textile materials softened therewith, e.g. to towels and the like goods in which water-repellency is not desirable. The compounds are preferably applied from alcoholic, e.g. from isopropanol solution. Application from glacial acetic acid solution is also possible but less desirable in view of smell and acidity of such agents, even after dilution with water.

On the other hand, a preferred class of compounds according to the invention, which falls under the formulas

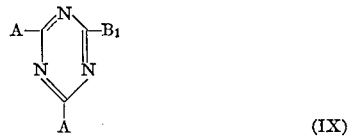

(IX)

wherein A and $B_1$ have the same meaning as given hereinbefore, and

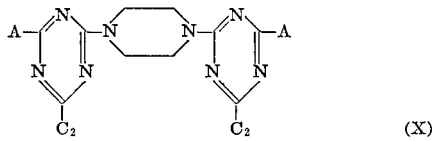

(X)

wherein A has the same meaning as given hereinbefore, and $C_2$ represents A or $B_1$, are distinguished as gloss-imparting, self-polishing waxes which are particularly useful as a principal constituent of dry-bright polishing compositions.

Agents containing e.g. about 5% of the compounds of Formula X, when used e.g. as floor polishes, also have a distinct anti-slip effect; floors treated with such agents are much less slippery than those treated with floor polishes not containing a compound of Formula X.

Finally, compounds of a preferred subclass of the formula

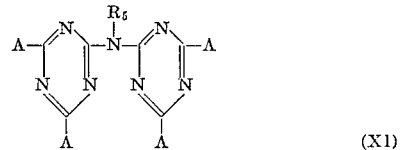

(XI)

wherein A and $R_5$ have the same meanings as given hereinbefore, are waxes of brown or dark-brown to brownish black shade and serve as polishing agents or principal constituents of such agents for polishing leather, e.g. shoe leather, especially also in order to retard the tendency of such leather to absorb water.

The waxes of the Formulas IX to XI, inclusive, given hereinbefore are readily emulsifiable. When used in major amounts (e.g. 20 to 70% by weight calculated on the total weight of solids) in surface-treating agents, especially in floor polishes, they impart to such polishes a certain gloss which is further enhanced by rubbing, e.g. with a soft cloth or the like, or, especially in the case of compounds of Formula IX, in which $B_1$ represents N-(lower alkyl)-piperazino, and in the case of the compounds of Formula X, supra, by subsequent washing of such surface, in particular floors, with water or with alkaline detergents. This constitutes an important progress, because many commercially available floor polishes will show enhanced gloss after rubbing with, e.g. a soft cloth or a polishing brush, but will not withstand washing with water and especially not with alkaline agents.

In the compounds of Formula I, and especially in those of Formulas III, IV and V, the presence of at least one amino group having one shorter and one longer alkyl substituent as represented by A in those formulas, is necessary to obtain compounds suitable for use as main polish constituent in surface treating agents according to the invention.

The trisamino-s-triazine derivatives of Formula I have well defined melting points and wax-like properties; they can thus be used instead of commercial natural and synthetic waxes or together therewith for the treatment and finishing of surfaces of all types. They have the characteristic properties of natural waxes such as solubility in fatty solvents, miscibility with natural and synthetic waxes and, with the addition of suitable emulsifying agents, can be worked up in water to form finely dispersed emulsions. The new compounds produce coatings which are resistant to chemicals, particularly they have good stability to alkali. In their excellent suitability as waxes, they are equivalent for all practical purposes to the montanic acid esters.

Surface-treating agents according to the invention are obtained by mixing a trisamino-s-triazine derivative of Formula I or several such derivatives with the usual substances which are suitable for the treatment of surfaces. Such substances are, for example, the following: natural and synthetic waxes, resins, silicones, etc. which improve the physical properties, also solvents, as well as inorganic and organic fillers, e.g. silicates, milled plastics, anionic, cationic or non-ionic dispersing agents, cleansing agents such as, e.g. natural and synthetic soaps, tensioactive substances, pigments, agents to improve the stability to light, stabilizers of all types such as corrosion inhibitors, scents, dyestuffs, biocidal active substances or agents containing such substances, e.g. insecticides, fungicides, bactericides, etc.

More particularly, the surface-treating agents according to the invention, for instance in the form of floor polishes, can also contain, besides a compound or compounds of Formula I, as main component, volatile solvents such as are used in wood-sealing agents, namely, ethyl acetate, acetone, methylethyl ketone, ethanol, toluene and the like.

The surface-treating agents according to the invention can be in the form of and used as aerosols, solvents, emulsions, semi-solid and solid pastes. The agents can thus serve to protect and to finish surfaces (e.g. polishing waxes) of all types, by which is also included the treatment of paper, e.g. the production of carbon paper.

Trisamino-s-triazines of Formula I wherein two bis-amino-s-triazine radicals are bound together by the piperazine-1,4-diyl radical are known compounds. They can be obtained by reacting two molecules of a 2-halogen-4,6-bis-amino-s-triazine correspondingly substituted in the amino group with piperazine, the reaction being performed at temperatures between 100 and 200° C., preferably in an inert gas atmosphere and optionally in the presence of an inert solvent and a proton acceptor.

The new tris-amino-s-triazines of the more restricted general formula

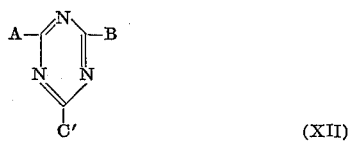

(XII)

wherein

A and B have the meanings given in Formula I, and
C' represents the pyrrolidino, piperidino, 4-methylpiperazino, morpholino or hexamethyleneimino radical or the group of the general formula

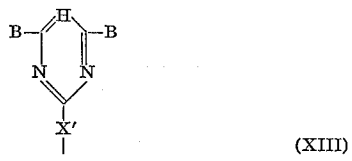

(XIII)

wherein

B has the meaning given in Formula I and
X' represents an alkylamino radical, or when A and B represent the group

C' may also represent the group

wherein each of $R_3$ and $R_4$ have the meanings given in Formula I, are obtained according to the invention by reacting cyanuric chloride with (a) two mols of the same or with one mol of each of two different secondary amines containing the radicals $R_1$ and $R_2$ defined above and with one mol of a secondary amine containing the radicals $R_3$ and $R_4$ defined above, or
(b) with two mols of the same or one mol of each of two different secondary amines containing the radicals $R_1$ and $R_2$ defined above and with one mol of pyrrolidine, piperidine, 4-methylpiperazine, morpholine or hexamethyleneimine, or
(c) with one mol of a secondary amine containing the radicals $R_1$ and $R_2$ defined above and with 2 mols of pyrrolidine, piperidine, 4-methylpiperazine, morpholine or hexamethyleneimine or with one mol of each of two of the heterocyclic bases mentioned above, or
(d) with one mol of a secondary amine containing the radicals $R_1$ and $R_2$ defined above, one mol of pyrrolidine, piperidine, 4-methylpiperazine, morpholine or hexamethyleneimine and with one mol of a secondary amine introducing the group of general Formula XIII defined above, or
(e) with 2 mols of the same or one mol of each of two different secondary amines containing the radicals $R_1$ and $R_2$ defined above and with one mol of a secondary amine introducing the group of general Formula XIII defined above, the reaction optionally being performed in the presence of a solvent or diluent and also a proton acceptor.

As solvent for the reaction of the first and second chlorine atom of cyanuric chloride, those usual for this reaction are used such as water, mixtures of acetone and water, other mixtures of organic solvents with water, halogen hydrocarbons and aromatic hydrocarbons. Inorganic bases such as the carbonates and hydroxides of alkali metals, and organic bases such as secondary and tertiary amines are used as proton acceptors. The reaction temperature for the exchange of the first chlorine atom is from —20 to +10° C., for the second chlorine atom from 10 to 100° and for the third chlorine atom from 100 to 200° C.

The following non-limitative examples describe surface finishing agents according to the invention. Where not otherwise stated, parts and percentages are given therein by weight. The abbreviations A.N. and S.N. signify acid number and saponification number, respectively. The temperatures are given in degrees centigrade.

Example 1

(a)

4.95 parts of 1,4-bis-[2',4'-bis-N-methyl-N-n-octa-decyl-amino-s-triazinyl-(6')]-piperazine,
4.05 parts of petroleum wax (M.P. 86–88°; A.N. 13–16; S.N. 45–55; penetration 4–6 at 100 g./25°/5 sec.),
0.63 part of the condensation product of oleyl alcohol and ethylene oxide (molar ratio about 1:5), as emulsifier,
0.54 part of olein,
0.54 part of aminomethyl propanol,
77.89 parts of water.

(b)

1.20 parts of colophonium-modified phenolic resin having a melting point of about 152°, the phenolic resin base of which is produced as described in Example 2 of U.S. Patent 2,532,374,
0.40 part of conc. ammonia,
8.40 parts of water.

(c)

0.02 part of trimethyl-(γ-perfluoro-octylamido-propylene)-ammonium iodide, as wetting agent,
0.40 part of tris-(butoxyethyl)-phosphate,
0.98 part of water.

The components of the mixture (a), with the exception of water, are melted at 150°, the homogeneous melt is cooled to 100–110° and then slowly added, while stirring strongly, to the boiling water. The emulsion formed is cooled to room temperature and first the mixture (b) and then mixture (c) are added while stirring.

The resultant gloss-imparting emulsion wax composition is excellently suitable for the care of modern floors, polyvinyl chloride tiles being given a polish value of 27.7 measured on a 45° glossmeter of the Lange type (100 being the gloss of a black mirror viewed under an angle of 45°). As a comparison an emulsion produced according to the above example in which the above-mentioned piperazine derivative according to the invention was replaced by carnauba wax only attained a polish value of 17.7. In addition, the wax emulsion produced according to the above example with the substance according to the invention is considerably less slippery than one produced with carnauba wax.

The s-triazine derivative which is a main component of the above-described surface-treating composition, is of the structural formula

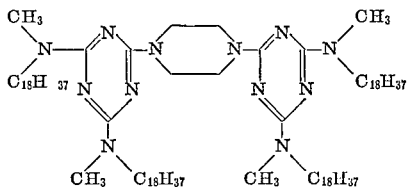

and is produced as follows:

37 parts of 2,4,6-trichloro-s-triazine are dissloved in 400 parts of anhydrous toluene and, at room temperature, a solution of 120 parts of N,N-dimethyl-N-n-octadecylamine in 400 parts of anhydrous toluene is added dropwise. The whole is then refluxed under an atmosphere of nitrogen until the calculated amount of chloromethane has been split off. The solvent is then distilled off in vacuo. After recrystallization from acetone, the 2-chloro-4,6-bis-N-methyl-N-n-octadecylamino-s-triazine melts at 58–62°.

34 parts of 2-chloro-4,6-bis-N-methyl-N-n-octadecyl-amino-s-triazine and 10 parts of piperazine are heated for 5 hours at 110–115° under an atmosphere of nitrogen. After cooling, excess piperazine and piperazine hydrochloride which have been formed are removed by washing with water and the residue is dried. 1,4-bis-[2',4'-bis-N-methyl-N-n-octadecyl-amino-s-triazinyl-(6')]-piperazine is obtained. After recrystallization from dioxan it melts at 98–102°.

Example 2

(a)

2.24 parts of 1,4-bis-[2'-morpholino-4'-methyl-N-n-octa-decylamino-s-triazinyl-(6')]-piperazine,
1.68 parts of carnauba wax,
1.68 parts of ester wax (montanic acid ester, M.P. 80–83°; A.N. 20–30; S.N. 135–150),
0.44 part of the same emulsifier as used in Example 1,
0.40 part of olein,
0.40 part of aminomethyl propanol,
33.16 parts of water.

(b)

16.70 parts of an aqueous dispersion of polystyrene (emulsion polymer) having a solids content of about 36% by weight,
0.10 part of the condensation product of nonylphenol and ethylene oxide (molar ratio about 1:15),
23.20 parts of water.

(c)

3.00 parts of alkali-soluble pentaerythritol resinate polyester resin having a melting range of 169–181° and an acid number of 190–200°, as levelling agent,
1.00 part of conc. ammonia,
16.00 parts of water.

The components of the mixture (a), with the exception of the water, are melted at 150°, the homogeneous melt is cooled to 100–110° and then added, while stirring strongly, to the boiling water. The emulsion formed is cooled to room temperature and the mixture (b) and (c) are added one after the other while stirring.

The resultant dry-bright wax-polymer emulsion is excellently suited for the care of modern floors in that the coating itself possess a certain gloss which can, however, be increased by polishing to a value of 24.3.

The s-triazine derivative, which is used as a main component in the above-described surface-treating composition, is produced as follows.

185 parts of cyanuric chloride are dissolved in 100 parts of carbon tetrachloride and 87.1 parts of morpholine are added while stirring intensively at 0° to 5°. A solution of 54 parts of sodium carbonate in 300 parts of water is then added. After stirring for 2 hours, a solution of 290 parts of N-methyl-N-n-octadecylamine in 1000 parts of carbon tetrachloride is added dropwise at 10 to 15° and then a solution of 54 parts of sodium carbonate in 300 parts of water is added dropwise. The whole is then slowly heated and afterwards refluxed for 5 hours. On completion of the reaction, the solvent is distilled off. The residue is stirred with 1500 parts of acetone. The undissolved part is filtered off under suction, thoroughly washed with water and dried. 2-chloro-4-morpholino-6-N-methyl-N-n-octadecylamino-s-triazine is obtained which, after recrystallization from alcohol, melts at 52–54°.

482 parts of 2-chloro-4-morpholino-6-N-methyl-N-n-octadecylamino-s-triazine and 100 parts of piperazine are dissolved in 4000 parts of warm xylene and 45 parts of pulverized sodium hydroxide are added. The whole is then refluxed using a water separator under an atmosphere of nitrogen. On completion of the water separation, the mixture is refluxed for another 3 hours. The reaction mixture is filtered hot, the filtrate is evaporated to dryness in vacuo and the residue is stirred with 4000 parts of acetone. The solid, undissolved part is separated thoroughly washed with water and dried in vacuo. 1,4-bis-[2' - morpholino - 4'-N-methyl-N-n-octadecylamino-s-triazinyl-(6')]-piperazine is obtained which, after recrystallization from acetic acid ethyl ester, melts at 108–112°.

Example 3

(a)

4.250 parts of N,N-bis-[2'-N'-methyl-N'-n-octadecyl-amino-4'-morpholino-s-triazinyl-(6')]N-ethyl-amine,
4.250 parts of wax (montanic acid ester, M.P. 80–83°; A.N. 20–30; S.N. 135–150),
4.250 parts of petroleum wax (M.P. 86–88°; A,N. 13–16; S.N. 45–55; penetration 4–6 at 100 g./25°/5 sec),
0.850 part of olein,
0.765 part of the same emulsifier as in Example 1,
0.680 part of aminomethyl propanol,
69.955 parts of water.

(b)

2.250 parts of the same colophonium-modified phenolic resin as used in Example 1,
0.675 part of conc. ammonia,
12.075 parts of water.

The components of the mixture (a), with the exception of the water, are melted at 150°, the homogeneous melt is cooled to 100–110° and then slowly added, while stirring, to the boiling water. The emulsion formed is cooled to room temperature and the mixture (b) is added while stirring.

The resultant dry-bright emulsion wax is excellently suitable for the care of modern floors; it is self-polishing, but its gloss can still be increased by subsequent rubbing with a soft cloth. If this coating obtained on polyvinyl chloride tiles is washed with a moist cloth then the gloss value rises from 29 to 35 whilst, as a comparison, the gloss value of an emulsion produced according to the above example in which the wax body according to the invention is replaced by carnauba wax only rises on washing from 29.5 to 30.5.

A similar composition is obtained when replacing the triazinyl component in the above composition by an equivalent amount of 2-morpholino-4,6-bis-(N-methyl-N-n-octadecylamino-s-triazine or of N,N - bis-[2,4'-di-(N' - methyl - N' - n-actadecylamino)-s-triazinyl-(6)]-N-ethyl-amine.

The s-triazine derivatives used in the above compositions are produced as follows:

(1) 48.2 parts of 6-chloro-2-(6-methyl-N-n-octadecyl-amino)-4-morpholino-s-triazine and 49.2 parts of 6-ethyl-amino-2-N-methyl-N-n-octadeclamino - 4 - morpholino-s-triazine are dissolved by heating in 400 parts by volume of anhydrous pyridine while stirring. The reaction mixture is then refluxed for 18 hours under an atmosphere of nitrogen whereupon it is filtered hot, the filtrate is concentrated to dryness in vacuo and the residue thoroughly washed with water and dried in vacuo. N,N-bis-[2'-N'-methyl - N'-n-octadecylamino - 4' - morpholino-s-triazinyl-(6')]-N-ethyl-amine is obtained which, after recrystallization from acetone, melts at 76–78°.

(2) 37 parts of cyanuric chloride are dissolved in 400 parts of anhydrous toluene and, at room temperature, a solution of 1200 parts of N,N-dimethyl-N-n-octadecylamine in 400 parts of anhydrous toluene is added dropwise. The whole is then refluxed under an atmosphere of nitrogen until the calculated amount of chloromethane has been split off. The solvent is then distilled off in vacuo. After recrystallization from acetone, the 2-chloro - 4,6-bis-N-methyl-N-n-octadecylamino-s-triazine melts at 58–62°.

34 parts of 2-chloro-4,6-bis-N-methyl-N-n-octadecylamino-s-triazine and 10 parts of morpholine are heated for 5 hours at 110–115° under an atmosphere of nitrogen. After cooling, excess morpholine and morpholine hydrochloride which have been formed are removed by washing with water and the residue is dried. 2 - morpholino-4,6 - bis - (N - methyl-N-n-octadecylamino)-s-triazine is obtained, which after recrystallization from methyl alcohol melts at 80–82°.

(3) 67.8 parts of 2 - chloro-4,6-bis-N-methyl-N-n-octadecyl-amino-s-triazine and 68.7 parts of 2 - ethyl-amino-4,6-bis - N-methyl-N-n-octadecylamino-s-triazine are dissolved by heating in 400 parts by volume of anhydrous pyridine while stirring. The reaction mixture is then refluxed for 18 hours under an atmosphere of nitrogen whereupon it is filtered hot, the filtrate is concentrated to dryness in vacuo and the residue throughly washed with water and dried in vacuo. N,N-bis-[2,4-di-(N'-methyl - N'-n-octadecylamino)-s-triazin-(6)-yl]-N-ethylamine is obtained which, after recrystallization from acetone, melts at 55–57°. When this brownish-black substance is incorporated in a surface-treating agent of the composition given in Example 3, in lieu of the tri-substituted ethylamine component, and black boot leather is polished therewith, it is given a black gloss similar to that of a standard black boot polish, and a retarded tendency to absorb water.

Example 4

5.0 parts of 2 - (N'-methyl-piperazino)-4-morpholino-6-(N''-methyl-N''-n-octadecyl-amino)-s-triazine are dissolved in 95.0 parts of isopropanol, if necessary while heating, whereupon a clear solution is formed. This solution is excellently suitable for softening textiles particularly cotton towelling which has become hardened by repeated washing. Such goods are laid for a few minutes in a bath which contains 40 parts of the above-mentioned solution per 1000 parts by volume of water. After treatment in this bath, the goods are wrung out and dried in the air. Even greatly hardened and scratchy cotton towelling regains its original soft and fleecy handle. It is not rendered unduly water repellent by such treatment.

Similar good softener dispersions are produced as described in Example 4, supra, by replacing the 40 parts of isopropanolic 5%-softener solution used therein by the same amount of an isopropanolic 5%-solution of N,N-bis-[2,4 - di - (N' - methyl-N'-n-octadecyl-amino)-s-triazinyl - (6)] - N-ethyl-amine, or by 4 parts of an isopropanolic 5%-solution of 2,4 - di - (N - methyl-N-n-octadecyl-amino)-6-[N-(β-hydroxyethyl) - N-(β-chloroethyl)-amino]-s-triazine. M.P. 80–82°.

The textile softener compound used in Example 4, supra, is produced as follows:

185 parts of cyanuric chloride are dissolved in 1000 parts of carbon tetrachloride and 87.1 parts of morpholine are added while stirring intensively at 0° to 5°. A solution of 54 parts of sodium carbonate in 300 parts of water is then added. After stirring for 2 hours, a solution of 290 parts of N-methyl-N-n-octadecylamine in 1000 parts of carbon tetrachloride is added dropwise at 10 to 15° and then a solution of 54 parts of sodium carbonate in 300 parts of water is added dropwise. The whole is then slowly heated and afterwards refluxed for 5 hours. On completion of the reaction, the solvent is distilled off. The residue is stirred with 1500 parts of acetone. The undissolved part is filtered off under suction, thoroughly washed with water and dried. 2-chloro-4-morpholino-6-N - methyl - N - n - octadecylamino-s-triazine is obtained which, after recrystallization from alcohol, melts at 52–54°.

482 parts of 2-chloro-4-morpholino-6-N-methyl-N-n-octadecylamino-s-triazine and 110 parts of N-methylpiperizine are dissolved in 4000 parts of warm xylene and 45 parts of pulverized sodium hydroxide are added. The whole is then refluxed in a water separator under an atmosphere of nitrogen. On completion of the water separation, the mixture is refluxed for another 3 hours. The reaction mixture is filtered hot, the filtrate is evaporated to dryness in vacuo and the residue is stirred with 4000 parts of acetone. The solid, undissolved part is separated, thoroughly washed with water and dried in vacuo. 2-N'-methylpiperazino - 4 - morpholino-6-N''-methyl-N''-n-octadecylamino-s-triazine is obtained which, after recrystallisation from dioxan melts at 48–51°.

Example 5 (Dry-bright emulsion wax)

(a)

3.19 parts of 2,4-bis-(N-methyl-N-n-octadecyl-amino)-6-(N'-methyl-piperazino)-s-triazine,
3.19 parts of paraffin (M.P. 50–52°),
6.38 parts of montanic acid ester wax (M.P. 80–83°, A.N. 20–30; S.N. 135–150),
1.70 parts of olein,
1.36 parts of aminomethyl propanol,
1.53 parts of cetyl alcohol polyglycol ether with 4 to 5 ethyleneoxy groups, as emulsifying agent,
67.66 parts of water;

(b)

2.25 parts of the same colophonium-modified phenolic resin as used in Example 1,
0.67 part of aqueous concentrated ammonia (25%) and
12.07 parts of water.

The components of mixture (a), with the exception of the water, are melted at 150° and stirred until a homogeneous melt is obtained. The melt is cooled to 100–110°, the water is brought to the boil and is then added thereto, and the resulting mixture (a) is cooled to room temperature. This mixture (a) is obtained in the form of an emulsion to which the solution (b) is added. The resultant emulsion is excellently suitable for the care of modern floors, such as "vinyl" flooring.

Example 6

10 parts of 2,4-bis-[N-methyl-N-n-octadecyl-amino)-6-pyrrolidino-s-triazine were dissolved in 90 parts of isopropanol by heating to 90° on the water bath.

Leather samples were impregnated with this solution by immersion therein for 5 minutes, and then air-dried. The leather then contained about 13% of the aforesaid s-triazine, calculated on the dry weight of the leather.

The impregnated leather samples were then immersed for several hours in water together with untreated control samples of the same leather. While untreated leather absorbed water very rapidly, e.g. 100% (calculated on the weight of the dry leather) within the first hour, and a total of 120% in 18 hours, the impregnated leather samples absorbed water much more slowly. Thus the amount of water absorbed reached 100% only after 18 hours.

Example 7

(a)

4.480 parts of N,N'-bis-[2-morpholino-4-N-methyl-n-octadecylamino-s-triazinyl-(6)]-piperazine,

11

3.360 parts of an isocyanate polymeric wax (softening point 93°, A.N. 25–35; S.N. 50–65; penetration 1–3 at 100 g./25°/5 sec.), as described in Manufacturing Chemist and Aerosol News, July 1965, page 59,
2.800 parts of montanic acid ester wax (M.P. 80–83°; A.N. 20–30; S.N. 135–150),
0.560 part of montanic acid ester wax (M.P. 80–83°; A.N. 140–155; S.N. 160–180),
0.448 part of the same emulsifier as used in Example 1,
0.560 part of aminomethyl propanol,
0.224 part of a saturated aqueous solution of KOH,
66.568 parts of water;

(b)

2.80 parts of the same colophonium-modified phenolic resin as used in Example 1,
1.00 part of concentrated ammonia,
16.20 parts of water;

(c)

0.01 part of the same wetting agent as used in Example 1,
0.99 part of water.

The compounds of the mixture (a), with the exception of water, are melted at 150°, the homogeneous melt is cooled to 100–110° and then slowly added, while stirring strongly, to the boiling water. The emulsion formed is cooled to room temperature and first the mixture (b) and then mixture (c) are added while stirring.

The resulting gloss-imparting emulsion wax composition is excellently suitable for the care of modern floors. More especially the treated floors are rendered non-slippery. This is due to an anti-slip effect of the above-described composition which is not shown in any comparable degree by a similar composition in which, however, N,N'-bis-[2-morpholino-4-N-methyl-n-octadecyl-amino-s-triazinyl-(6)]-piperazine is replaced by an equal amount of the third of the above-mentioned constituents, namely montanic acid ester wax of M.P. 80–83°, A.N. 20–30 and S.N. 135–150.

When vinyl asbestos plates are polished with the composition according to Example 7, on the one hand, and with the last-mentioned conventional triazine derivative-free composition on the other hand, and the dynamic slip resistance of the treated plates is measured, e.g. by Method No. 30 of "Standard Methods of Testing Paint, Varnish, Lacquer and Related Products," published as DEF 1053 by the British Ministry of Defence, then, the composition according to the invention shows a value of 9.1 lbs., while the conventional composition compared therewith shows a value of only 1.5 lbs.

If similar dynamic slip resistance values as shown by the aforesaid composition of Example 7 are to be attained also in the case of the conventional composition, a considerable amount of adjuvant such as finely dispersed silica would have to be added, but would lead to a strong reduction of gloss in the polished surface. Floors treated with the composition according to the invention therefore combine high gloss with pronounced slip-resistance.

12

Example 8

(a)

4.200 parts of 1,4-bis[2',4'-bis-N-methyl-n-octadecyl-amino-s-triazinyl-(6)]-piperazine,
1.355 parts of montanic acid ester wax (M.P. 80–83°; A.N. 20–30; S.N. 135–150),
4.200 parts of the same isocyanate polymeric wax as used in Example 7,
0.735 part of montanic acid wax (M.P. 80–83°; A.N. 140–155; S.N. 160–180),
0.630 part of the same emulsifying agent as used in Example 1,
0.210 part of KOH 10%,
0.630 part of aminomethyl propanol,
62.04 parts of water;

(b)

3.50 parts of the same colophonium-modified phenolic resin as used in Example 1,
1.00 part of concentrated ammonia,
20.50 parts of water;

(c)

0.10 part of a condensation product of nonylphenyl and ethylene oxide (molar ratio about 1:15),
0.90 part of water.

The components of the mixture (a), with the exception of water, and melted at 150°, the homogeneous melt is cooled to 100–110° and then slowly added, while stirring strongly, to the boiling water. The emulsion formed is cooled to room temperature and first the mixture (b) and then mixture (c) are added while stirring.

The resulting gloss-imparting emulsion wax composition is excellently suitable for the care of modern floors. When subjecting vinyl asbestos plates to a treatment with the composition according to Example 8 on the one hand, and with a similar composition in which the triazine derivative has been replaced by an equal amount of montanic acid ester wax (second component of the above composition) on the other hand, and testing the slip resistance of the differently treated plates in the same manner as described in Example 7, then a dynamic slip resistance of 8.6 lbs. is found in the case of plates treated with the composition according to Example 8 as compared with a value of about 1.5 lbs. in the case of the triazine derivative-free composition.

Floors treated with the composition of Example 8 thus combine high gloss, which is even enhanced after washing with water or alkaline detergents, with an unexpectedly high slip-resistance.

Example 9

Similar surface-treating compositions according to the invention are produced by replacing the triazine component in each of the compositions of the preceding examples by an equivalent amount of an s-triazine of the Formula I in which A, B and C represent the substituent groups shown in the respective columns of the following table.

The s-triazine derivatives are produced by the methods exemplified hereinbefore using equivalent amounts of correspondingly substituted starting materials.

TABLE

| No. | A | B | C | M.P., °C. |
|---|---|---|---|---|
| | | Example 7 | | |
| (1) | —N(CH₃)(C₁₈H₃₇) | —N(CH₃)(C₁₈H₃₇) | —N☐ (piperidine) | 66–67 |
| (2) | Same as above | Same as above | —N⬡ | 68–70 |
| (3) | do | do | —N⬡N—CH | 63–65 |

TABLE—Continued

Example 7

| No. | A | B | C | M.P., °C. |
|---|---|---|---|---|
| (4) | do | —N(morpholine) | —N(morpholine) | 90–92 |
| (5) | do | —N(CH$_3$)(C$_{18}$H$_{37}$) | —N(C$_2$H$_4$OH)(C$_2$H$_4$OH) | 78–80 |
| (6) | —N(C$_4$H$_9$)(C$_{18}$H$_{37}$) | —N(C$_4$H$_9$)(C$_{18}$H$_{37}$) | —N(C$_2$H$_4$OH)(C$_2$H$_4$Cl) | -------- |
| (7) | —N(CH$_3$)(C$_{18}$H$_{37}$) | —N(morpholine) | triazine with —N(CH$_3$)(C$_{18}$H$_{37}$), —N(H)(C$_2$H$_5$), and morpholine substituents | 76–78 |
| (8) | Same as above | —N(C$_5$H$_{11}$)(C$_{18}$H$_{37}$) | —N(pyrrolidine) | -------- |
| (9) | —N(C$_2$H$_5$)(C$_{16}$H$_{33}$) | —N(C$_4$H$_9$)(C$_{10}$H$_{21}$) | —N(piperidine) | -------- |
| (10) | —N(C$_3$H$_7$)(C$_{12}$H$_{25}$) | —N(C$_3$H$_7$)(C$_{12}$H$_{25}$) | —N(N-methylpiperazine) | -------- |
| (11) | —N(C$_2$H$_5$)(C$_{16}$H$_{33}$) | —N(C$_2$H$_5$)(C$_{16}$H$_{33}$) | —N(piperidine) | -------- |
| (12) | —N(C$_5$H$_{11}$)(C$_{18}$H$_{37}$) | —N(C$_5$H$_{11}$)(C$_{18}$H$_{37}$) | —N(morpholine) | -------- |
| (13) | —N(CH$_3$)(C$_{16}$H$_{33}$) | —N(C$_5$H$_{11}$)(C$_{10}$H$_{21}$) | —N(C$_2$H$_4$OH)(C$_2$H$_4$OH) | -------- |
| (14) | —N(C$_2$H$_5$)(C$_{12}$H$_{25}$) | —N(C$_4$H$_9$)(C$_{12}$H$_{25}$) | —N(C$_3$H$_6$OH)(C$_3$H$_6$OH) | -------- |
| (15) | —N(C$_3$H$_7$)(C$_{10}$H$_{21}$) | —N(C$_3$H$_7$)(C$_{16}$H$_{33}$) | —N(C$_4$H$_8$OH)(C$_4$H$_8$OH) | -------- |
| (16) | —N(C$_4$H$_9$)(C$_{18}$H$_{37}$) | —N(C$_2$H$_5$)(C$_{18}$H$_{37}$) | —N(C$_{18}$H$_{37}$)(C$_2$H$_4$OH) | -------- |
| (17) | —N(C$_2$H$_5$)(C$_{12}$H$_{25}$) | —N(CH$_3$)(C$_{16}$H$_{33}$) | —N(C$_2$H$_4$OH)(C$_2$H$_4$Cl) | -------- |
| (18) | —N(CH$_3$)(C$_{12}$H$_{25}$) | —N(C$_5$H$_{11}$)(C$_{12}$H$_{25}$) | —N(C$_2$H$_4$OH)(C$_2$H$_4$Br) | -------- |
| (19) | —N(C$_2$H$_5$)(C$_{10}$H$_{21}$) | —N(C$_4$H$_9$)(C$_{16}$H$_{33}$) | —N(pyrrolidine) | -------- |

TABLE—Continued

Example 7

| No. | A | B | C | M.P., °C. |
|---|---|---|---|---|
| (20) | $-N(C_3H_7)(C_{18}H_{37})$ | $-N(C_3H_7)(C_{18}H_{37})$ | $-N$(piperidine) | -------- |
| (21) | $-N(C_5H_{11})(C_{16}H_{33})$ | $-N(CH_3)(C_{10}H_{21})$ | $-N$(N-ethylpiperazine, $N-C_2H_5$) | -------- |
| (22) | $-N(CH_3)(C_{18}H_{37})$ | $-N(C_2H_{11})(C_{18}H_{37})$ | triazine: $-N(CH_3)-$, $-N(CH_3)(C_{18}H_{37})$, $H_{11}C_5-N-C_{18}H_{37}$ | -------- |
| (23) | $-N(C_2H_5)(C_{16}H_{33})$ | $-N(C_4H_9)(C_{10}H_{21})$ | triazine: $-N(CH_3)-$, $-N(C_2H_5)(C_{16}H_{33})$, $H_9C_4-N-C_{10}H_{21}$ | -------- |
| (24) | $-N(CH_3)(C_{10}H_{21})$ | $-N(C_5H_{11})(C_{16}H_{33})$ | triazine: $-N(C_4H_9)-$, $-N(C_5H_{11})(C_{16}H_{33})$, $H_3C-N-C_{10}H_{21}$ | -------- |
| (25) | $-N(CH_3)(C_{18}H_{37})$ | $-N$(pyrrolidine) | triazine: $-N(CH_3)-$, $-N$(pyrrolidine), $H_3C-N-C_{18}H_{37}$ | -------- |
| (26) | $-N(C_2H_5)(C_{16}H_{33})$ | $-N$(piperidine) | triazine: $-N(CH_3)-$, $-N$(piperidine), $H_5C_2-N-C_{16}H_{33}$ | -------- |
| (27) | $-N(C_3H_7)(C_{12}H_{25})$ | $-N$(hexamethyleneimine) | triazine: $-N(CH_3)-$, $-N$(hexamethyleneimine), $H_7C_3-N-C_{12}H_{25}$ | -------- |
| (28) | $-N(C_4H_9)(C_{10}H_{21})$ | $-N$(N-methylpiperazine, $N-CH_3$) | triazine: $-N(C_2H_5)-$, $-N$(N-methylpiperazine, $N-CH_3$), $H_9C_4-N-C_{10}H_{21}$ | -------- |
| (29) | $-N(C_5H_{11})(C_{16}H_{33})$ | $-N$(morpholine, O) | triazine: $-N(C_2H_5)-$, $-N$(morpholine), $H_{11}C_5-N-C_{16}H_{33}$ | -------- |
| (30) | $-N(C_3H_7)(C_{12}H_{25})$ | $-N(C_4H_8OH)_2$ | triazine: $-N(C_3H_7)-$, $-N(C_3H_7)(C_{12}H_{25})$, $N(C_4H_8OH)_2$ | -------- |
| (31) | $-N(C_5H_{11})(C_{16}H_{33})$ | $-N(C_2H_4OH)(C_2H_4Br)$ | triazine: $-N(C_5H_{11})(C_{16}H_{33})$, $H_9C_4-N-$, $HOH_4C_2-N-C_2H_4Br$ | -------- |

3,594,374

TABLE—Continued

| No. | Example 7 | | | M.P., °C. |
|---|---|---|---|---|
| | A | B | C | |
| (32) | —N(CH₃)(C₁₂H₂₅) | morpholino | triazine with —N(CH₃)(C₁₈H₃₇), piperazinyl, and morpholino substituents | ———— |
| (33) | —N(C₅H₁₁)(C₁₈H₃₇) | —N(C₅H₁₁)(C₁₈H₃₇) | triazine with three —N(C₅H₁₁)(C₁₈H₃₇) groups via piperazine; H₁₁C₅—N—C₁₈H₃₇ | ———— |
| (34) | —N(CH₃)(C₁₈H₃₇) | morpholino | triazine with piperazinyl, morpholino, morpholino groups | 145–146° |
| (35) | —N(CH₃)(C₁₀H₃₇) | —N(C₅H₁₁)(C₁₀H₂₁) | triazine with —N(CH₃)(C₁₈H₃₇), piperazinyl; H₁₁C₅—N—C₁₀H₂₁ | ———— |
| (36) | —H(C₃H₇)(C₁₂H₂₅) | —N(C₂H₅)(C₁₆H₃₃) | triazine with —N(C₃H₇)(C₁₂H₂₅), piperazinyl; H₅C₂—N—C₁₆H₃₃ | ———— |
| (37) | —N(C₆H₁₁)(C₁₈H₃₇) | pyrrolidino | triazine with piperazinyl, pyrrolidino; H₁₁C₅—N—C₁₈H₃₇ | ———— |
| (38) | —N(C₄H₉)(C₁₀H₂₁) | piperidino | triazine with piperazinyl, piperidino; H₉C₄—N—C₁₀H₂₁ | ———— |
| (39) | —N(C₃H₇)(C₁₂H₂₅) | hexamethyleneimino | triazine with piperazinyl, hexamethyleneimino-X; H₇C₃—N—C₁₂H₂₅ | ———— |
| (40) | —N(C₂H₅)(C₁₆H₃₃) | —N(piperazinyl)N—CH₃ | triazine with piperazinyl, N-methylpiperazinyl; H₅C₂—N—C₁₆H₃₃ | ———— |
| (41) | —N(C₂H₅)(C₁₈H₃₇) | —N(piperazinyl)N—C₂H₅ | triazine with two N-ethylpiperazinyl; H₅C₂—N—C₁₈H₃₇ | ———— |

TABLE—Continued

| No. | A | B | C | M.P., °C. |
|---|---|---|---|---|
| (42) | —N(CH₃)(C₁₈H₃₇) | —N(C₂H₄OH)₂ | 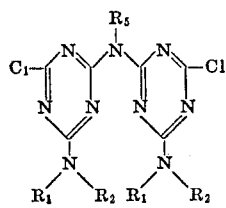 with CH₃/C₁₈H₃₇ and N(C₂H₄OH)₂ | -------- |
| (43) | —N(C₄H₉)(C₁₀H₂₁) | —N(C₄H₈OH)₂ | triazinyl with C₄H₉/C₁₀H₂₁ and N(C₄H₈OH)₂ | -------- |
| (44) | —N(C₅H₁₁)(C₁₈H₃₇) | —N(C₃H₆OH)(C₃H₆Br) | triazinyl with C₅H₁₁/C₁₈H₃₇ and HOH₆C₃—N—C₃H₆Br | -------- |

Compounds falling under Formula I mentioned in Examples 4, 5 and 6 are produced analogously to the process illustrated in Examples 1, 2 and 3, from the correspondingly substituted starting materials.

We claim:
1. A compound of the formula

wherein
  each of $R_1$ and $R_5$ represents alkyl of from 1 to 5 carbon atoms;
  $R_2$ represents alkyl of from 10 to 18 carbon atoms; and
  $C_1$ represents the grouping

in which $R_1$ and $R_2$ have the meanings ascribed to them above, pyrrolidino, piperidino hexamethyleneimino, 4-(lower alkyl)-piperazino or in grouping $$-N\genfrac{}{}{0pt}{}{R_3}{R_4}$$

in which each of $R_3$ and $R_4$ is alkyl of from 1 to 5 carbon atoms substituted by a member selected from the group consisting of hydroxyl, fluorine, chlorine and bromine.

2. A compound according to claim 1 which is N,N-bis-[2,4 - bis - (N - methyl - N - n - octadecylamino) - s-triazinyl-(6)]-N-ethylamine.

References Cited

UNITED STATES PATENTS 2,675,383   4/1954   De Benneville _____ 260—249.6
3,045,013   7/1962   Frey _____ 260—249.6X ALEX MAZEL, Primary Examiner J. H. TURNIPSEED, Assistant Examiner U.S. Cl. X.R.

106—2, 3, 10, 270, 287; 117—139, 139.5, 142, 147, 152, 161; 252—8.57, 8.8; 260—246